(12) United States Patent
Holmes

(10) Patent No.: US 7,617,630 B2
(45) Date of Patent: Nov. 17, 2009

(54) METHOD AND APPARATUS FOR EXTERMINATING SUBTERRANEAN BURROWING ANIMALS

(76) Inventor: Larry Allan Holmes, Box 196, Balzac, Alberta (CA) T0M 0E0

( * ) Notice: Subject to any disclaimer, the term of this patent is extended or adjusted under 35 U.S.C. 154(b) by 133 days.

(21) Appl. No.: 11/448,075

(22) Filed: Jun. 7, 2006

(65) Prior Publication Data
US 2007/0283616 A1    Dec. 13, 2007

(51) Int. Cl.
*A01M 17/00*    (2006.01)
(52) U.S. Cl. .......................................................... 43/124
(58) Field of Classification Search .................. 43/124, 43/125, 138, 140; 111/118; 280/839
See application file for complete search history.

(56) References Cited

U.S. PATENT DOCUMENTS

| | | | |
|---|---|---|---|
| 841,297 A | 1/1907 | Wyard | |
| 1,492,732 A | 5/1924 | Knopf | |
| 2,467,922 A | 4/1949 | Woytal et al. | |
| 3,481,511 A | 12/1969 | Metke | |
| 4,026,330 A | 5/1977 | Dunn | |
| 4,829,706 A | 5/1989 | Perry | |
| 4,833,818 A | 5/1989 | Berta | |
| 5,031,355 A * | 7/1991 | Ryan | 43/130 |
| 5,058,311 A | 10/1991 | Erickson | |
| 5,109,628 A | 5/1992 | Ellefson | |
| 5,109,629 A | 5/1992 | King, Jr. et al. | |
| 5,199,196 A * | 4/1993 | Straley | 37/442 |
| 5,319,878 A * | 6/1994 | Moffett et al. | 43/124 |
| 5,548,921 A | 8/1996 | Kleisath | |
| 5,588,252 A | 12/1996 | Jones | |
| 5,700,039 A | 12/1997 | Manning | |
| 5,860,243 A * | 1/1999 | Stager | 43/124 |
| 6,026,609 A * | 2/2000 | Rawls | 43/124 |
| 6,171,098 B1 | 1/2001 | Meyer et al. | |
| 6,247,265 B1 | 6/2001 | Maze et al. | |
| 2003/0061758 A1 | 4/2003 | Wilson | |
| 2005/0144832 A1 | 7/2005 | Shaffer | |

FOREIGN PATENT DOCUMENTS

| | | |
|---|---|---|
| GB | 2 391 445 | 11/2004 |
| WO | WO 97/39621 | 10/1997 |

\* cited by examiner

*Primary Examiner*—Kurt Rowan
(74) *Attorney, Agent, or Firm*—Antony C. Edwards

(57) ABSTRACT

A method and apparatus for exterminating subterranean burrowing air-breathing animals which burrow subterranean tunnels having burrow hole openings at ground level, the apparatus including an elongate arm having a base end and an opposite distal end, a frame mounted to a vehicle, the base end of the arm mounted to the frame, a selectively actuable actuator mounted so as to cooperate between the frame and the arm, at least one reservoir of a lethal substance, conduits cooperating between the reservoirs and the arm for carrying the lethal substance to deliver the lethal substance from the distal end of the arm into the burrow hole openings, wherein positioning the arm and delivering the lethal substance is remotely actuable from within the vehicle.

16 Claims, 14 Drawing Sheets

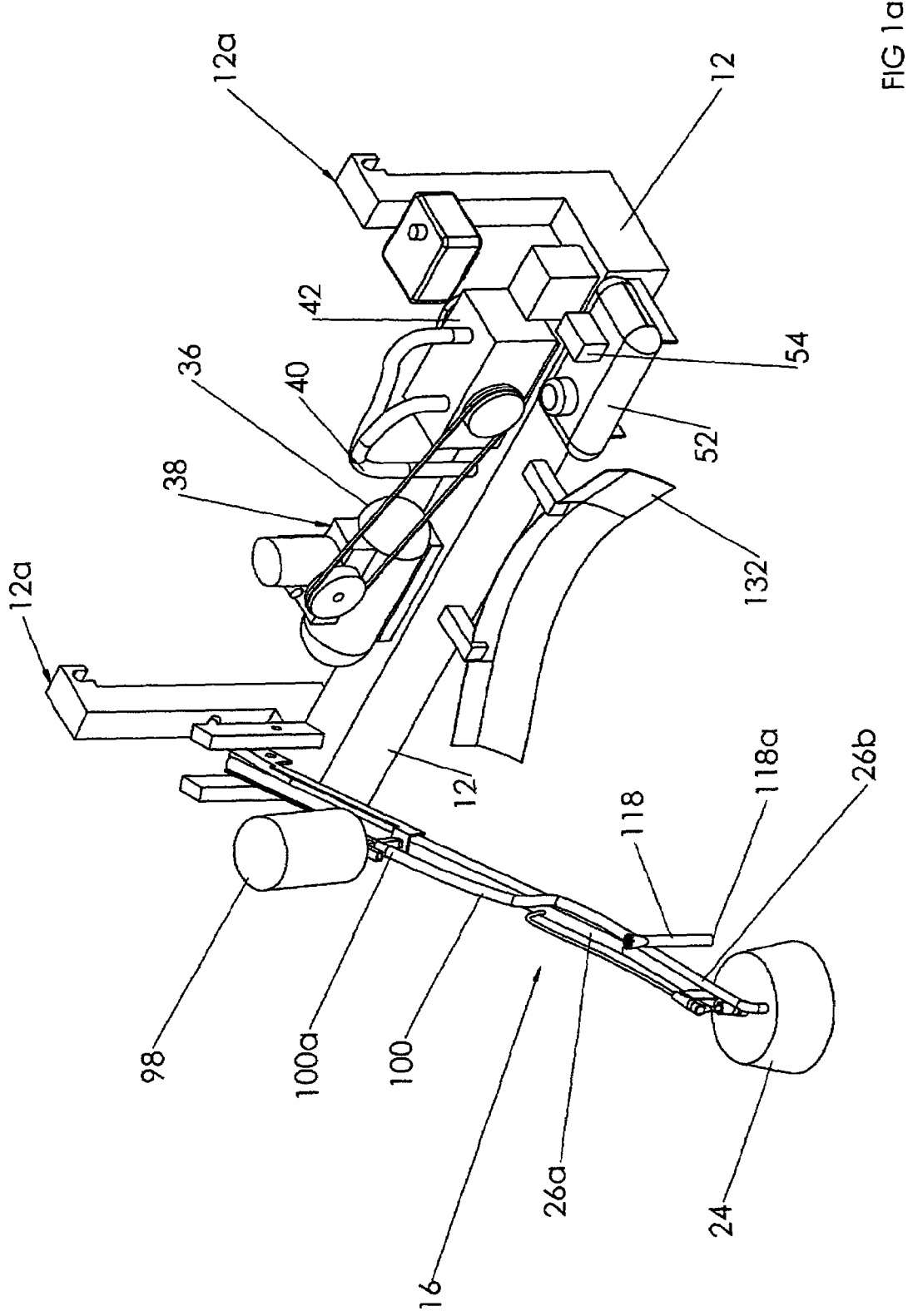

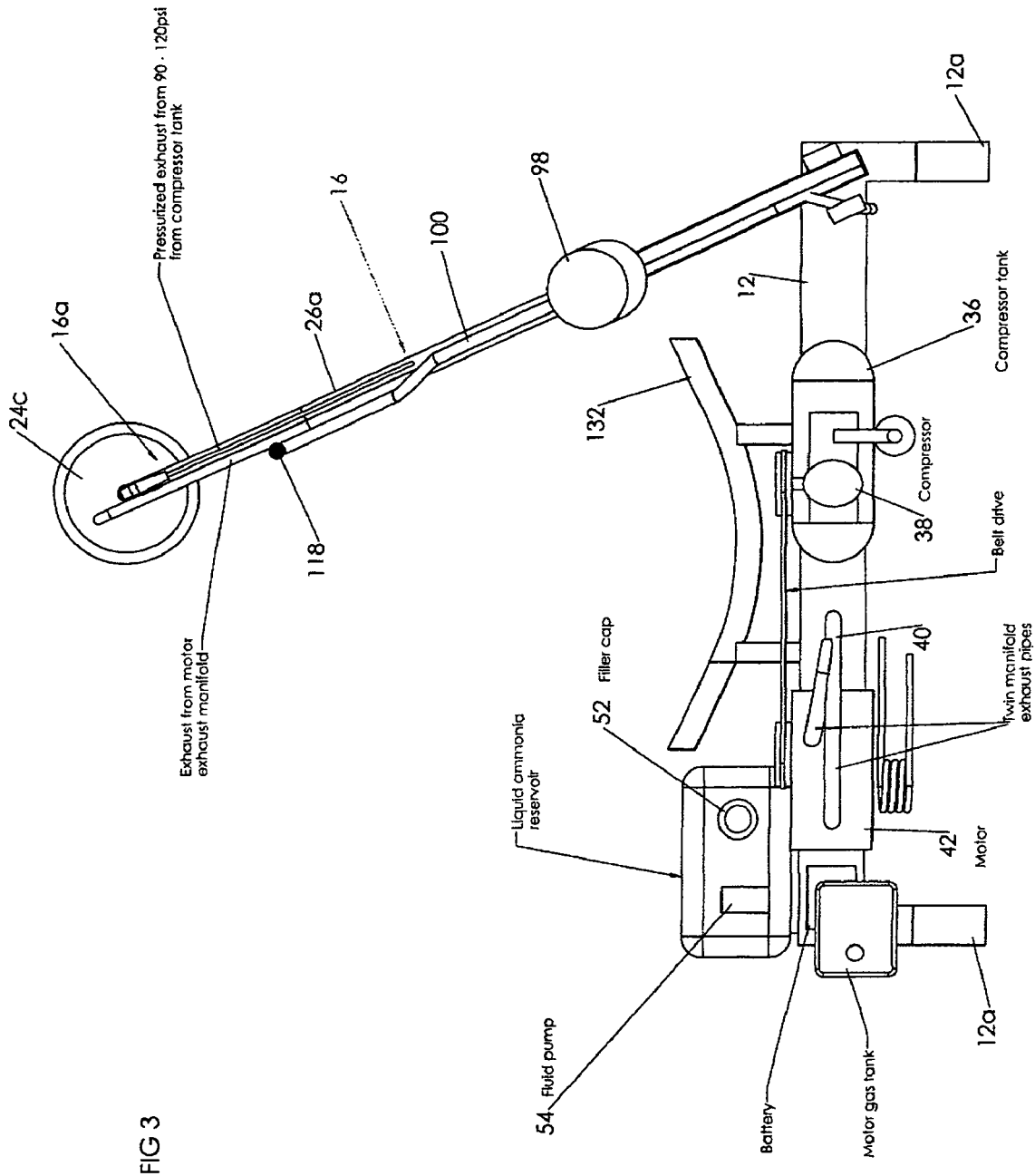

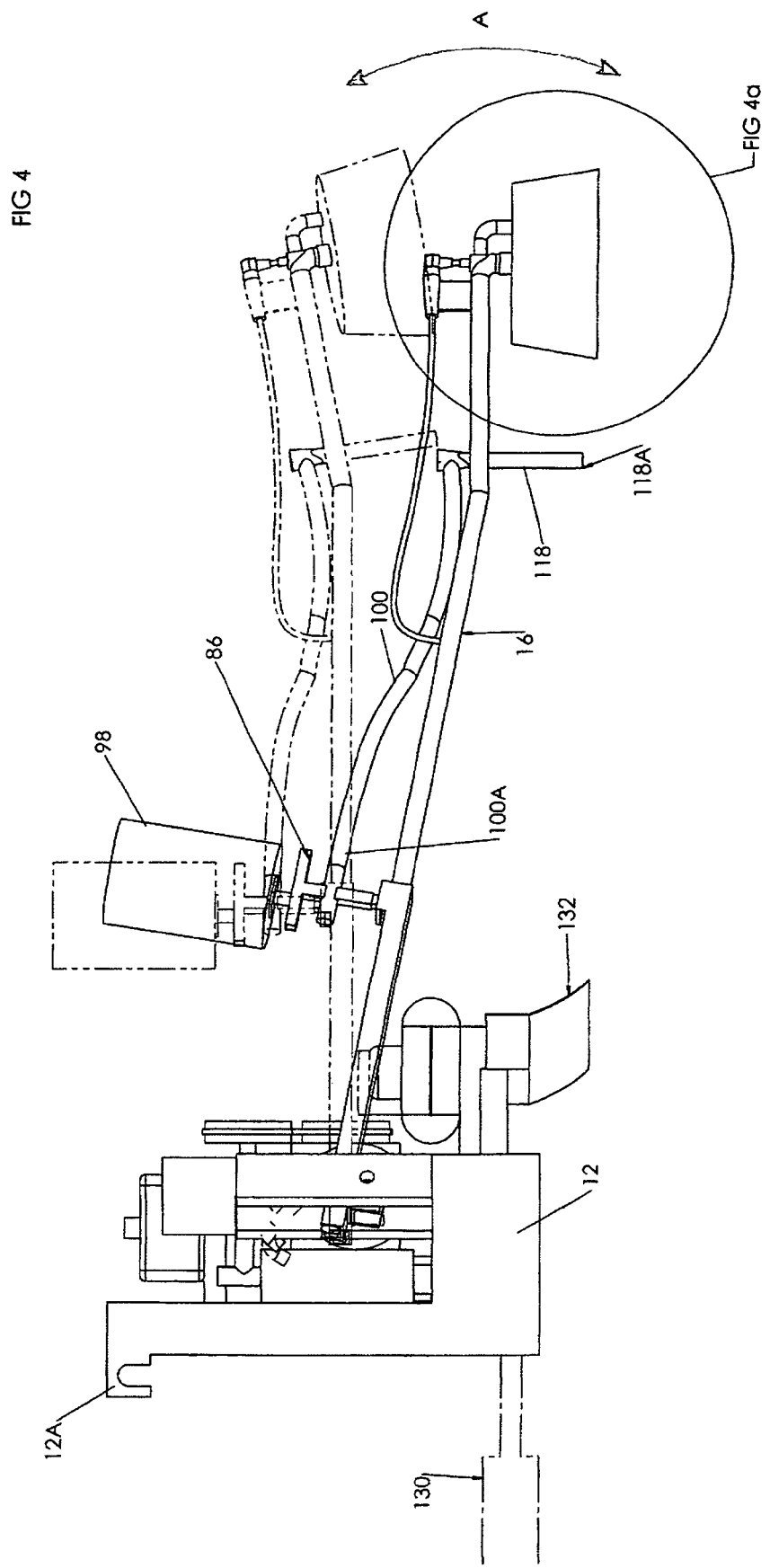

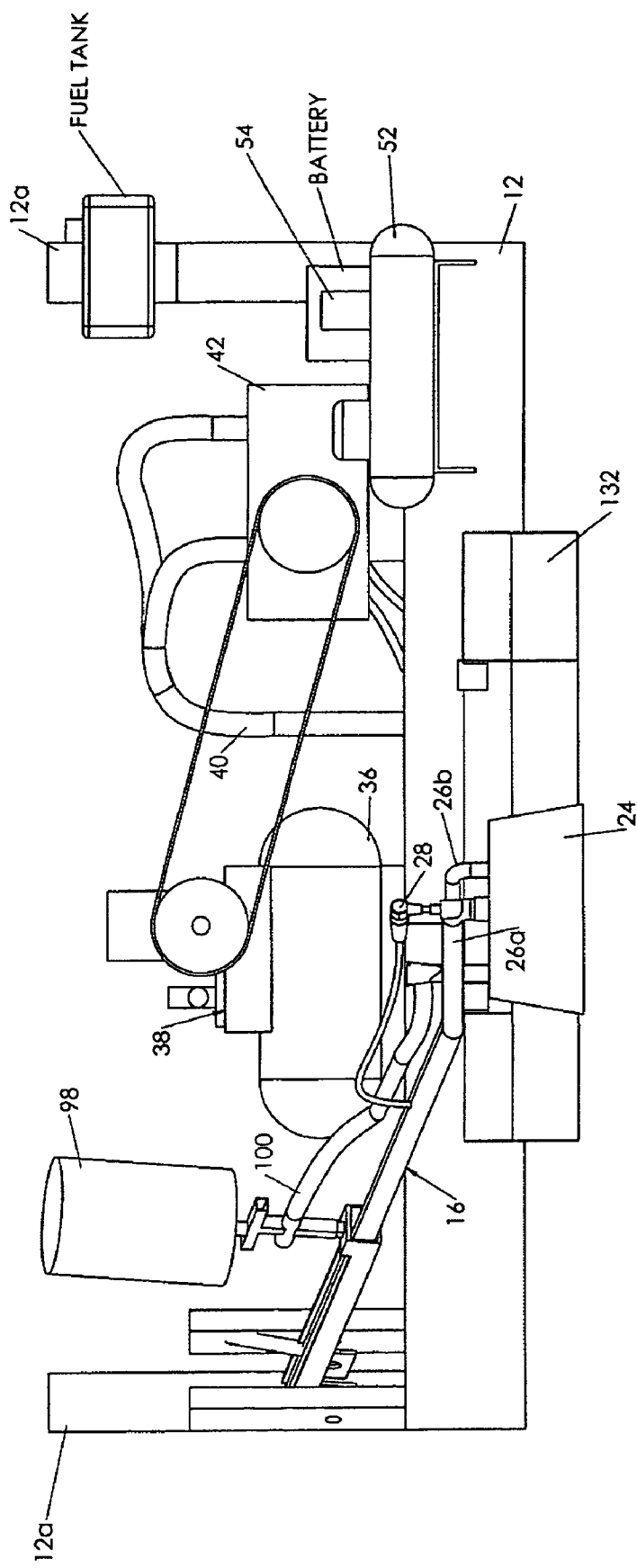

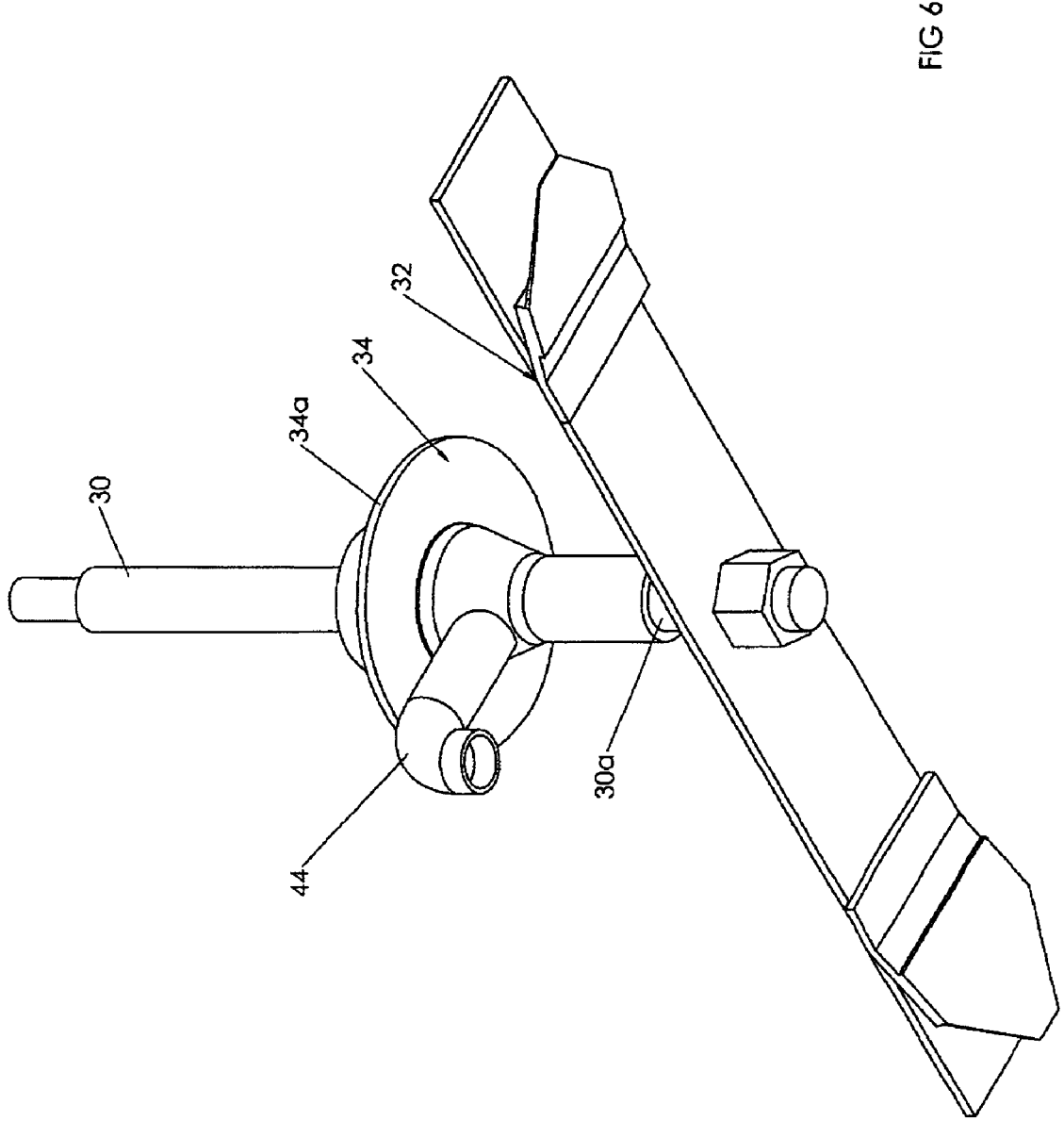

METHOD AND APPARATUS FOR EXTERMINATING SUBTERRANEAN BURROWING ANIMALS

FIELD OF THE INVENTION

This invention relates generally to the extermination of underground burrowing animals and more specifically to a system and method for exterminating gophers and other subterranean burrowing animals using a remotely controlled arm to, in combination, selectively suffocate, poison or otherwise euthanize the burrowing animals in their habitat.

BACKGROUND OF THE INVENTION

In the prior art, applicant is aware of numerous devices and methods for exterminating burrowing animals such as gophers, moles and also various insects including fire ants wherein extermination is accomplished by, for example, suffocation by a gas which is injected in a toxic amount to reportedly cause respiratory failure, pulmonary oedema, coma and/or death, carbon monoxide when exhausted from an internal combustion engine, or poisoning by the use of for example anhydrous ammonia in a liquid state, or chlorine or other rodenticides, or by heat and/or concussive explosion by the injection of combustibles into the burrows followed by subsequent ignition, or by the use of underground netting so as to entangle and thereby trap the burrowing animal, and of course the use of more conventional above ground traps.

As reported by Kleisath in his U.S. Pat. No. 5,548,921 which issued Aug. 27, 1996 for his Method and Apparatus for Gassing Gophers, in various localities gophers have become unwanted pests due to uncontrollable damage to orchards, gardens and other types of vegetation. Gophers or moles live in underground burrows which may include individual tunnels or runs of one-half mile or more in length. A community of gophers typically build a labyrinth of such underground runs and can become severe economic liabilities to farmers and other people engaged with agriculture. Accordingly, many measures have been taken by farmers and gardeners to eradicate these animals. Unfortunately, the extent of the underground labyrinth of tunnels and the multiple exits from these tunnels have made gophers extremely difficult to find and kill.

According to Kleisath one known method of killing gophers or moles is to introduce a poisonous gas through one of the entrance or exit holes into the gopher burrow. The gas either kills the gopher or drives the gopher out through another hole where it can be killed by conventional means, e.g. a gun or club. Kleisath notes that it is important to ensure that the poisonous gas does not escape back through the entrance hole, thereby causing damage to surrounding agriculture or possibly being inhaled by the user. According to Kleisath, to prevent this from occurring, the prior art has mainly focused on pressurized cartridges that form poisonous gases, such as chloro-cyanic gas, through chemical combustion and then distribute these pressurized gases into the gopher burrows.

Kleisath discloses forming a shallow hole in the ground with a tip of a probe to locate the gopher burrow. A shallow hole is formed in the ground with the tip of the probe to locate the gopher burrow. A dry solid chlorine material is introduced into the burrow and water is poured into the hole onto the dry chlorine material to generate chlorine gas. The hole is then closed to seal the gaseous poison within the burrow, thereby allowing the gaseous poison to expand throughout the burrow and gas the animal.

SUMMARY OF THE INVENTION

In summary, the present invention may be characterized in one aspect as a system for exterminating subterranean burrowing air-breathing animals which burrow subterranean tunnels having burrow hole openings at ground level, wherein the system includes an arm mounted on a frame, itself mountable onto a vehicle, the frame a vehicle supporting at least one reservoir containing a lethal substance lethal to the animals, and a delivery mechanism extending from each reservoir out along the arm for dispensing or insemination of the lethal substance or substances into the burrow hole.

The arm may be defined as having a base end and an opposite distal end. The base end of the arm is mounted to the frame. A selectively actuable actuator is mounted so as to cooperate between the frame and the arm. The actuator when selectively actuated operates to at least raise and permit lowering of the distal end of the arm so that the distal end of the arm is positioned directly over a burrow hole opening wherein the actuator is remotely actuable from within the vehicle when the frame is mounted to the vehicle.

At least one conduit cooperates between each reservoir and the arm. The delivery mechanism includes a means for urging the lethal substance(s) along the corresponding conduits to convey the lethal substance(s) along the arm for delivery of the lethal substance(s) from the distal end of the arm into the burrow hole openings. The means for urging the lethal substance(s) along the arm is remotely actuable from within the vehicle when the frame is mounted to the vehicle.

In a preferred embodiment a bonnet mounted to the distal end of the arm. The bonnet defines a bonnet cavity having a lower opening. The bonnet is mounted to the distal end of the arm so as to downwardly dispose the opening below the arm. The bonnet cooperates with the conduit(s) so that delivery of the corresponding lethal substance(s) is into the bonnet cavity for delivery therefrom into the burrow hole opening.

The arm may include hollow first and second conduits extending from substantially the frame to the distal end of the arm, each the first and second conduits having a base end and an opposite distal end. The distal ends of the first and second conduits are mounted in fluid communication with the bonnet cavity. The base ends of the first and second conduits are mounted in fluid communication with for example two reservoirs containing lethal substances, for example, respectively, a source of exhaust gas from an internal combustion engine whether compressed and defined from a compressor reservoir or only under the pressure from the exhaust manifold (considered herein to be a reservoir for the purpose of construing that term), and a second source of lethal gas wherein the lethal gas is lethal either directly as a poison or indirectly as a suffocating agent to the air-breathing burrowing animals.

A blade may be mounted within the bonnet cavity so as to be disposed over and adjacent one of the burrow hole openings when the bonnet is mounted in the sealing engagement there over. The blade is selectively actuable by a blade actuator so as to kill the burrowing animal should a burrowing animal exit back through the burrow hole opening and into the bonnet cavity. The blade actuator may be a selectively actuable blade drive mounted to an upper side of the distal end of the arm and cooperating in driving engagement with the blade within the bonnet cavity.

One of the reservoirs may include a rodenticide reservoir for storing at least one rodenticide. The rodenticide reservoir is mounted in fluid communication, via a third conduit mounted on the arm, with a downspout depending from the arm. The downspout is sized to release a metered quantity of rodenticide from the rodenticide reservoir into the burrow hole opening. The rodenticide reservoir may be mounted on the base end of the arm adjacent the frame. A selectively actuable rodenticide flow controller may be provided, cooperating with the rodenticide reservoir, for selectively controlling flow of rodenticide to the downspout.

In the associated method according to the present invention for exterminating subterranean burrowing air-breathing animals, and given that the foregoing apparatus is provided, namely:

(i) an elongate arm having a base end and an opposite distal end, (ii) a frame mounted to a vehicle, the base end of the arm mounted to the frame, (iii) a selectively actuable arm actuator mounted so as to cooperate between the frame and the arm, the actuator when selectively actuated operating to at least raise and permit lowering of the distal end of the arm so that the distal end of the arm is positioned directly over a burrow hole opening wherein the actuator is remotely actuable from within the vehicle when the frame is mounted to the vehicle, iv) at least one reservoir of at least one lethal substance lethal to the air-breathing animals when introduced into the burrow hold openings, the at least one reservoir mounted adjacent the frame, and (v) at least one conduit cooperating between the at least one reservoir and the arm, and means for urging the at least one lethal substance along the at least one conduit to convey the at least one lethal substance along the arm for delivery of the at least one lethal substance from the distal end of the arm into the burrow hole openings, wherein the means for urging the at least one lethal substance along the arm is remotely actuable from within the vehicle when the frame is mounted to the vehicle;

the operator then follows the steps of:

a) positioning the vehicle so as to position the arm into proximity with one burrow hole opening of the burrow hole openings;

b) remotely actuating the arm actuator from inside the vehicle to actuate the arm so as to place the distal end of the arm over the burrow hole opening;

c) remotely actuating from inside the vehicle the means for urging so as to convey the at least one lethal substance along the arm and deliver the at least one lethal substance into the burrow hole opening.

The method may further include, in embodiments providing the bonnet, positioning the vehicle to position the bonnet into proximity with the burrow hole opening, and remotely actuating the arm actuator to place the bonnet cavity into sealing engagement over the burrow hole opening.

The method may further include the steps of selectively actuating the means for urging the lethal substance so as to deliver one or both of the exhaust gas and/or the lethal gas from the second source into the burrow hole opening and/or selectively actuating the blade actuator to actuate the blade so as to kill the burrowing animal should the burrowing animal exit through the burrow hole opening and into the bonnet cavity, and/or actuating the flow controller to meter a metered quantity of rodenticide into the burrow hole opening.

BRIEF DESCRIPTION OF THE DRAWINGS

FIG. 1a is, in perspective view, a simplified view of the exterminating apparatus of FIG. 1.

FIG. 3 is, in simplified plan view, the exterminating apparatus of FIG. 1.

FIG. 4 is, in left side elevation view, the exterminating apparatus of FIG. 3.

FIG. 5 is, in front elevation view, the exterminating apparatus of FIG. 3.

FIG. 6 is, in perspective view, the cutter blade assembly according to one embodiment for use in the exterminating apparatus according to the present invention.

DETAILED DESCRIPTION OF EMBODIMENTS OF THE INVENTION

Figure 1:
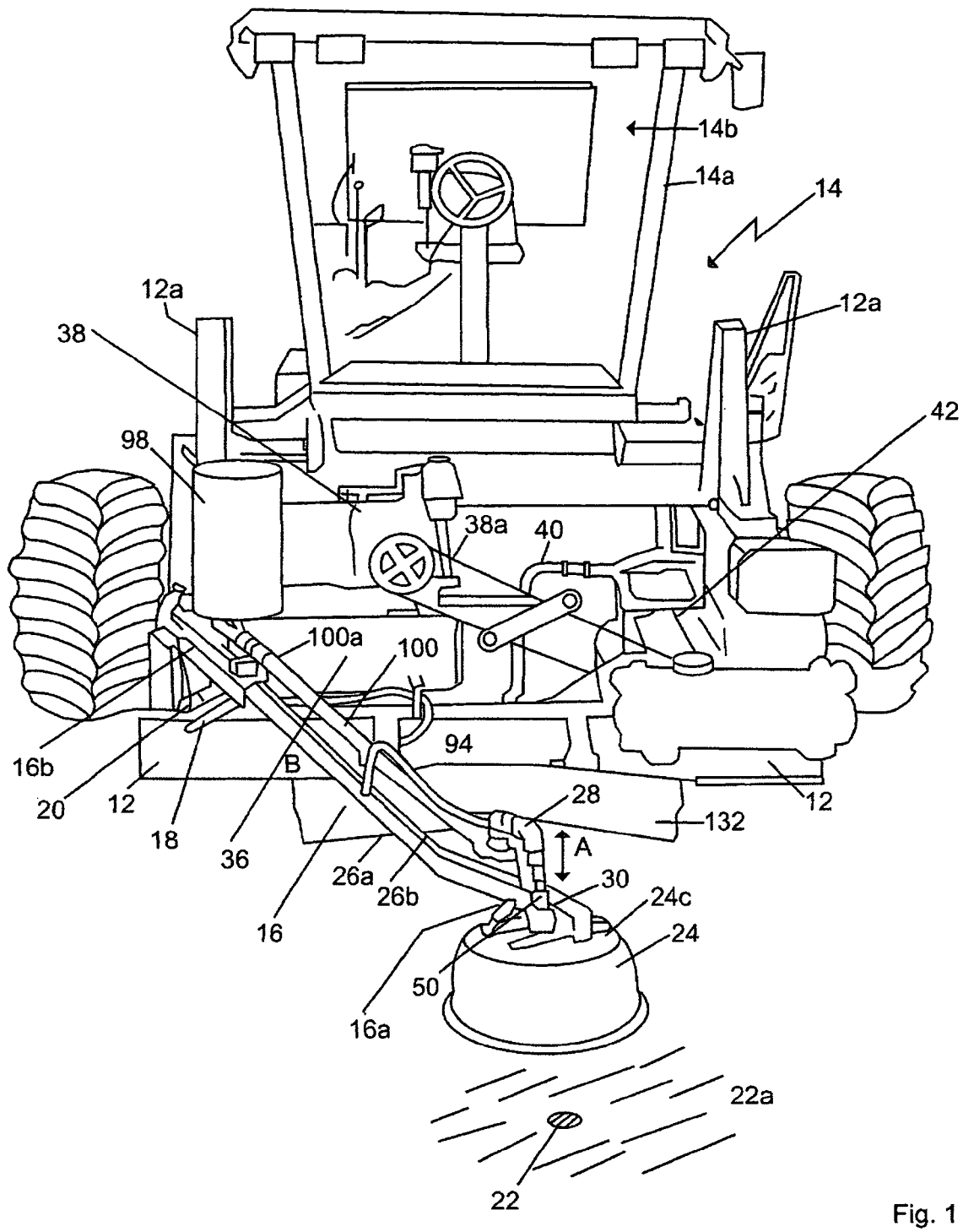
FIG. 1 is, in front elevation view, the exterminating apparatus according to the present invention mounted on the front of a tractor.

What is missing in the prior art, and which is an object of the present invention to provide, is an apparatus and a method of employing same which allows a single operator to efficiently exterminate gophers infesting a large area. This might be the typical case of a farmer faced with a gopher infestation extending across an expanse of agricultural land. Thus the present invention replaces prior art devices which in applicant's opinion are relatively slow and inefficient to use, for example which have to be manually carried or pushed on a cart or the like and thus require slow and energy intensive manual labour. In the past, a manual approach to exterminating gophers normally meant that the farmer could only employ one particular means of gopher extermination at a time, for example, carrying a container of rodenticide which the farmer then poured into the gopher holes one at a time. If the farmer desired to employ a different method of extermination, for example by using a hose attached to the exhaust pipe from a vehicle, then the farmer had to switch over to that manual system, again in a time consuming fashion, in order to attend to just one or several adjacent holes, before having to relocate the vehicle, rodenticide and other extermination implements to a different location on the field.

Thus in order to efficiently cover a lot of ground and in particular to efficiently process numerous gopher holes in a time efficient manner, the present invention provides a frame mounted system 10 having a plurality of extermination devices mounted or adjacent on a single frame 12. Frame 12 is mountable by conventional quick release couplers 12a onto a farm vehicle, for example onto the articulation front-end of a windrower or tractor 14 which thus allows a single operator to work in relative comfort within an enclosed cab 14a. Advantageously, the operator looks through a windshield 14b or window down over an operative arm 16 so as to remotely control arm 16 and the various extermination devices mounted on or adjacent frame 12 which cooperate with arm 16. Thus in a preferred embodiment not intended to be limiting, elongate arm 16 is mounted so as to extend from frame 12, generally orthogonally thereto, and in a preferred embodiment remotely actuated by for example a controller (not shown) mounted within cab 14a. Arm 16, which in one embodiment is lowered by gravity and/or the return biasing force of a resilient spring 18 and which is raised by a hydraulic actuator 20 such as known in the art, and otherwise in preferred embodiments which may be raised lowered and/or pivoted relative to the frame and/or vehicle by the use of actuators such as hydraulic actuators or other actuation means which do not form part of the present invention, allow for the selective raising and lowering in direction A and placement of the distal end 16a of arm 16 over gopher holes 22 adjacent the vehicle. Thus with the vehicle manoeuvred into position and temporarily parked so that the operator has a view of one or more gopher holes, for example generally in front of windshield 14b of tractor 14, the operator rotates arm 16 and/or tractor 14 to position distal end 16a of arm 16 so as to place an inverted bonnet 24 onto the target gopher hole 22 so that the hole is entirely enclosed under the bonnet, within the cavity 24a defined by the downwardly disposed opening and rim 24b of bonnet 24. Bonnet 24 may also be a housing, bin, container, cover, housing, or other like enclosure, collectively referred to herein as a bonnet. The downwardly disposed opening of bonnet 24 and annular rim 24b which when placed into contact with the ground surface 22a around gopher hole 22 forms a seal which is sufficient to allow for a slight pressurization of the gas pressure within cavity 24a of the bonnet without the escape of excessive amounts of gas from under the bonnet.

Arm 16 includes, and may be made up entirely of, a parallel pair of rigid hollow conduits or pipes 26a and 26b. The first pipe 26a of the pair of conduits terminates at distal end 16a of arm 16 at the centre of the upper surface 26c of bonnet 24, and supports there over, a rotary motor or rotary drive which for example may be a pneumatically actuated rotary drive head 28 which may then turn a detachably mounted shaft 30 extending down from head 28, through collar 34 mounted up against the upper surface 24c of bonnet 24 and into bonnet cavity 24a. A cutter blade 32 is mounted on the lower end of shaft 30 extending downwardly from rotary drive head 28 so as to dispose blade 32 relatively close to the opening into target gopher hole 22 when bonnet 24 is placed onto gopher hole 22. The opposite end of first pipe 26a, that is, the end 16b adjacent frame 12, is mounted to, in fluid communication with, a compressor reservoir 36 and associated compressor 38, itself in fluid communication with the exhaust outlet pipe 40 carrying exhaust gases from an internal combustion engine, for example a motor 42 mounted on frame 12. Motor 42 drives compressor 38 by belt drive 38a. Thus with the internal combustion engine operating, the exhaust gases are compressed and conveyed into first pipe 26a. The distal end of first pipe 26a is opposite the compressor, and is mounted in fluid communication with cavity 24a in bonnet 24 so that, with motor 42 running, the exhaust from the engine flows into the compressor and through to the compressor reservoir, and from there, through the first pipe, and into the bonnet cavity.

Figure 7:
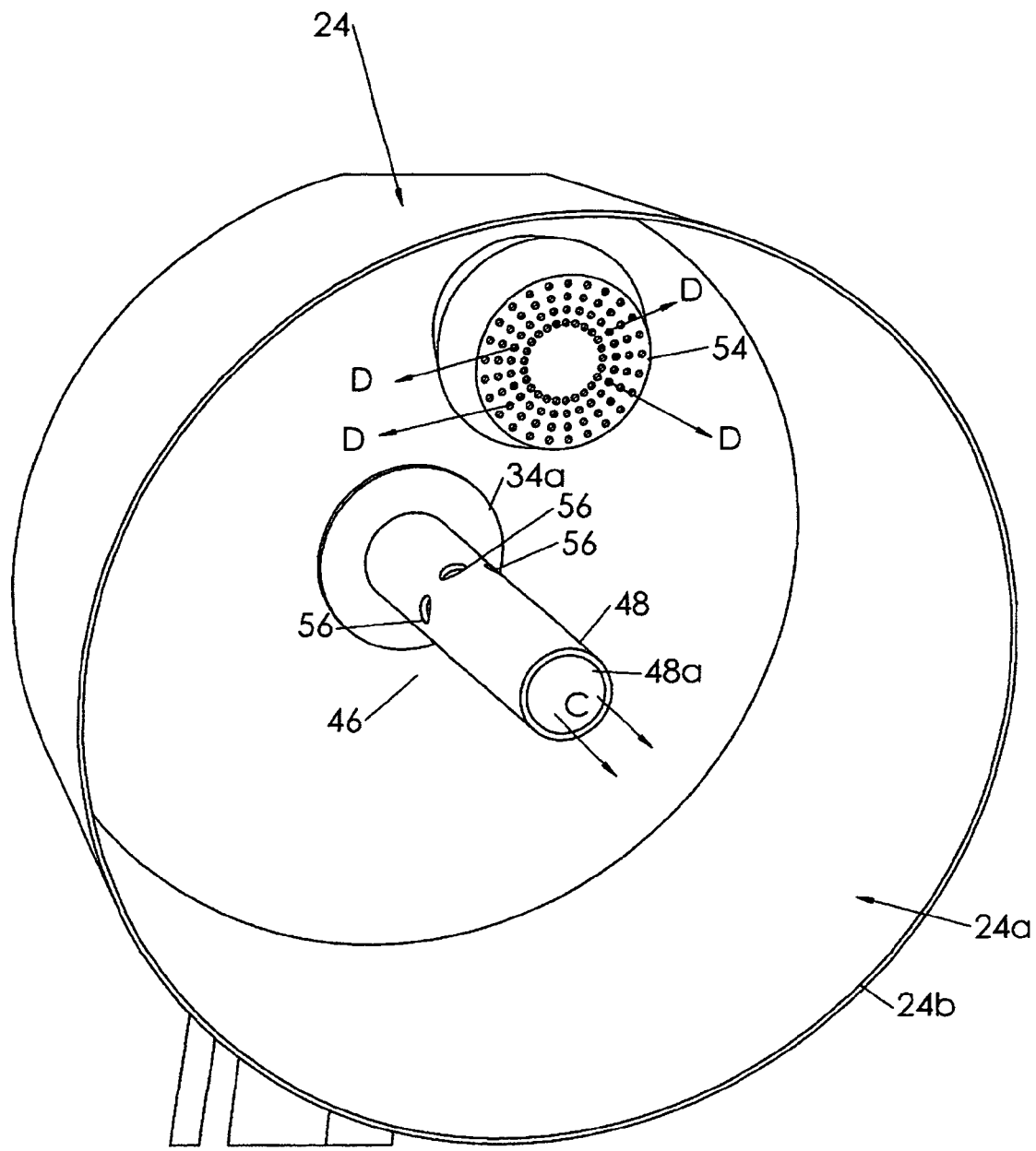
FIG. 7 is, in bottom perspective view, the bonnet, gas down pipe from the compressor, and muffler from the motor exhaust according to one aspect of the present invention.
Figure 8:
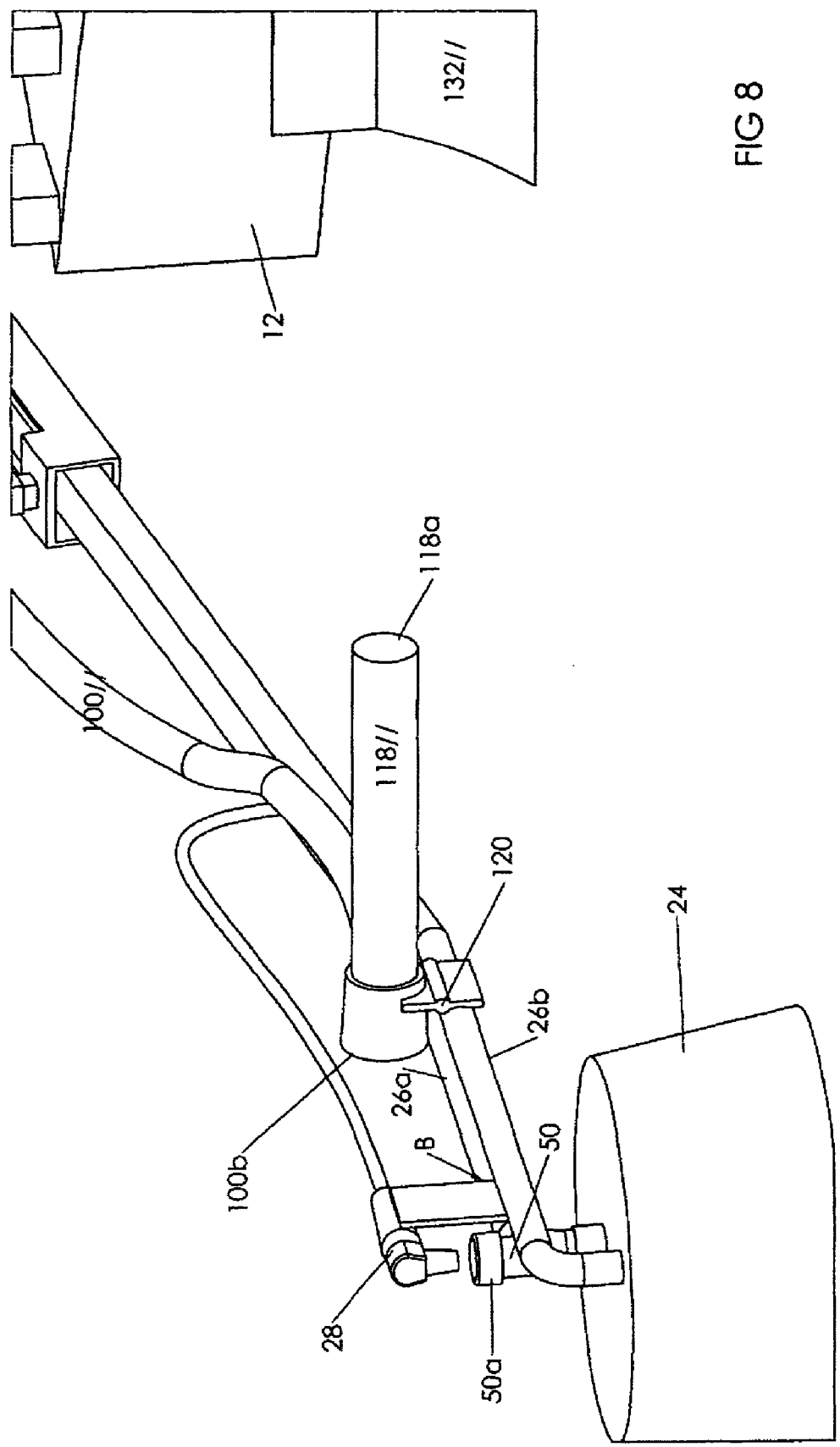
FIG. 8 is, in perspective view, the manipulator arm of FIG. 1 with the rodenticide downspout pivoted to its raised position.
Figure 9:
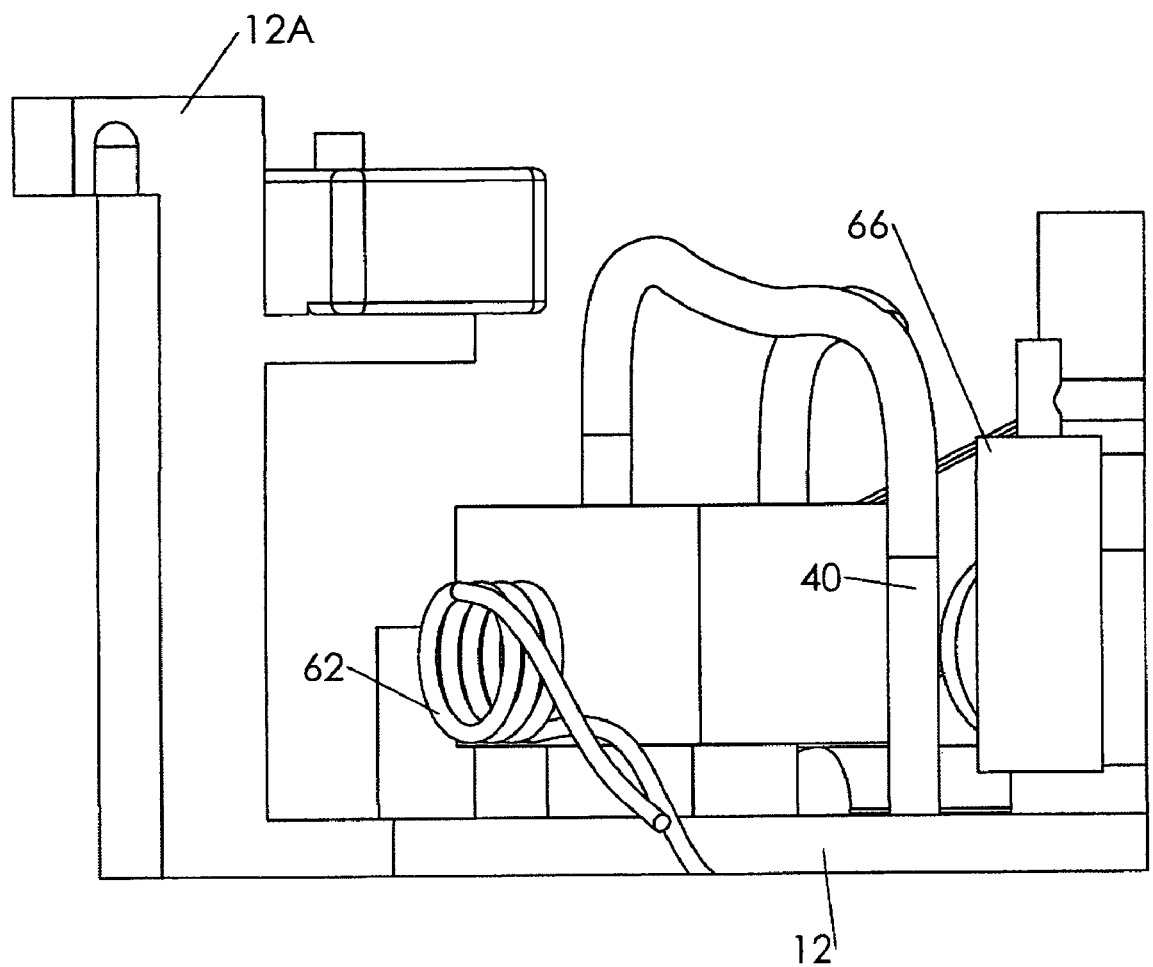
FIG. 9 is, in rear perspective view, the frame, motor, compressor, water condenser and cooling coils or heat exchange coils of the exterminating apparatus of FIG. 1.
Figure 10:
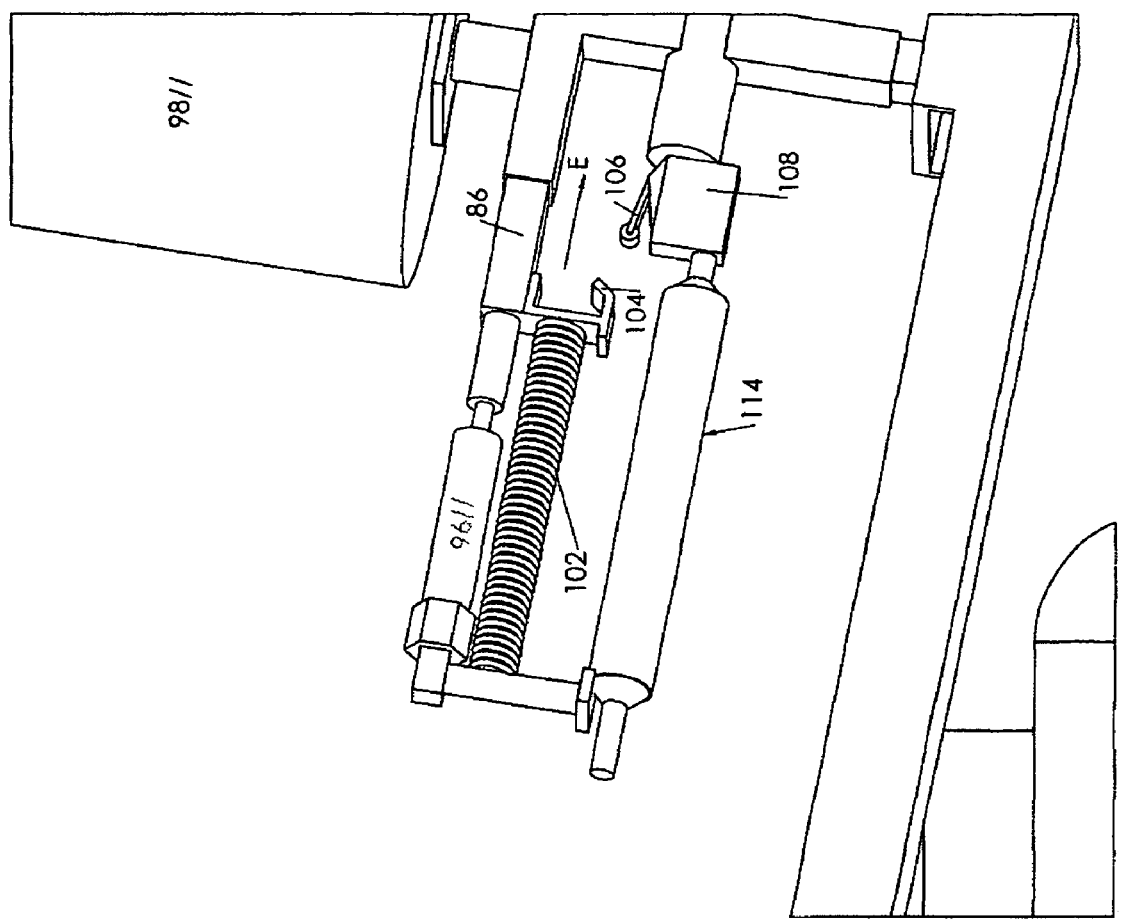
FIG. 10 is, in left side elevation view, the pneumatic cylinder, rodenticide metering slide, compressed gas reservoir, and slide actuated compressed gas valve of the rodenticide metering system according to one aspect of the present invention.
Figure 11:
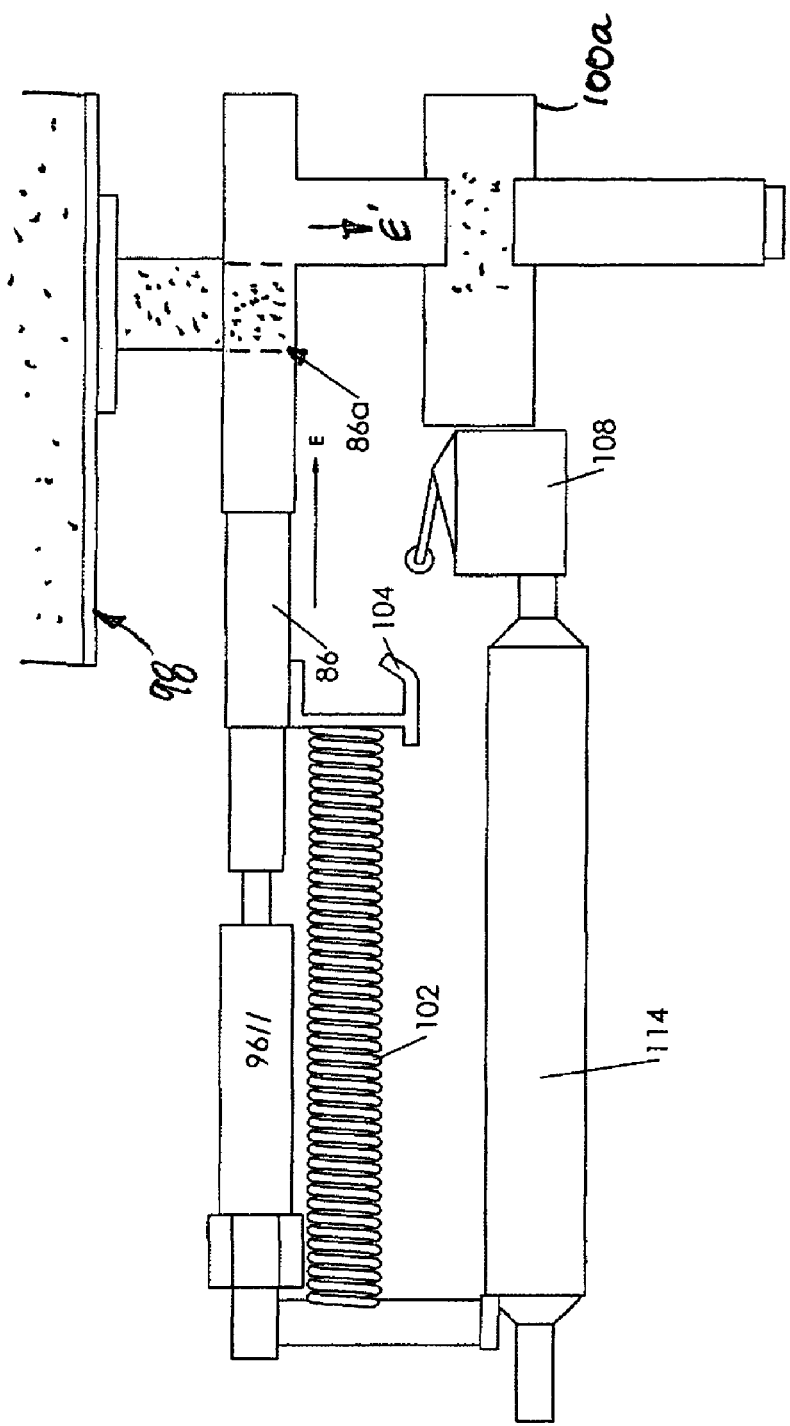
FIG. 11 is, an enlarged view of the rodenticide metering system of FIG. 10.
Figure 12:
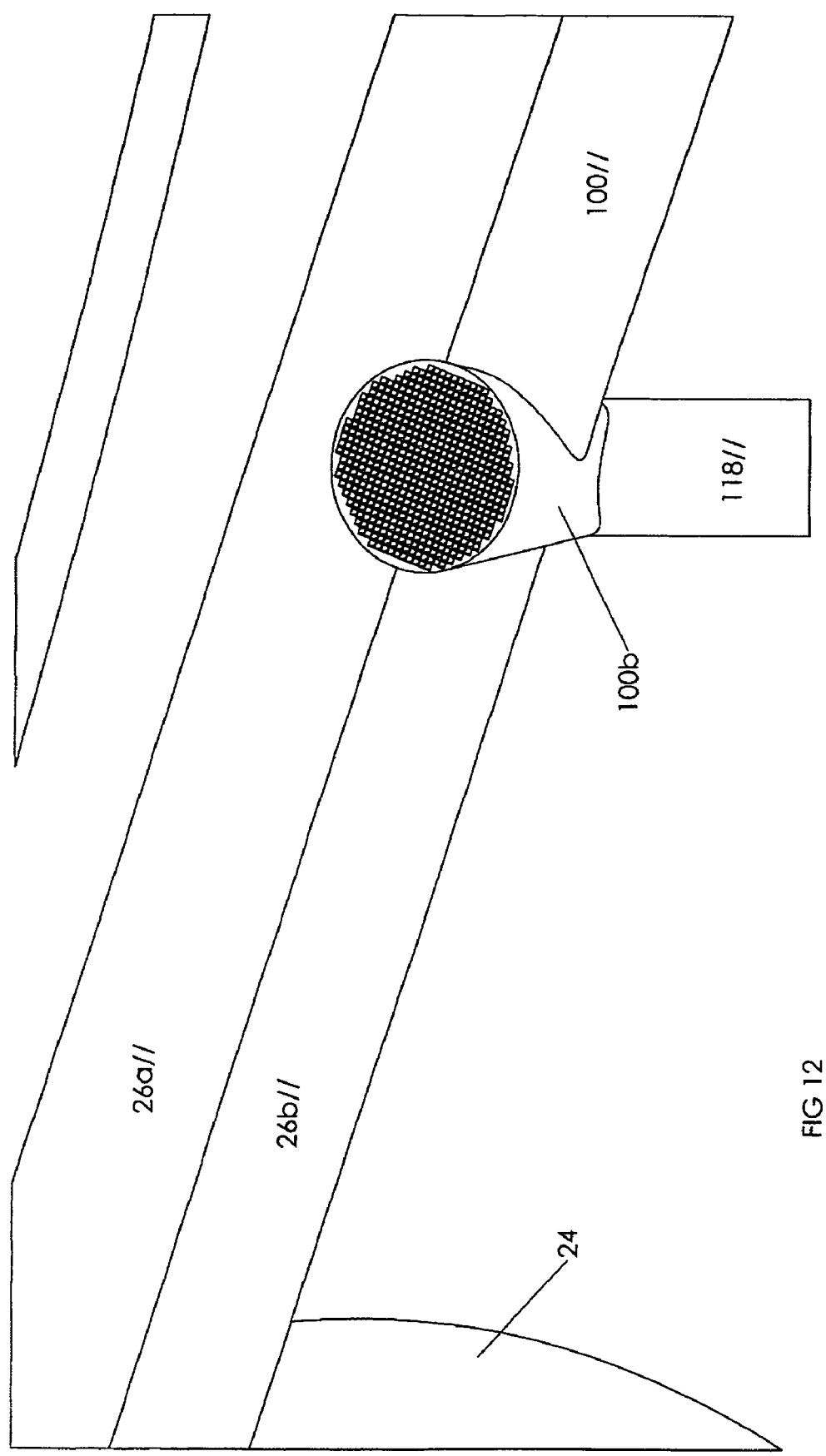
FIG. 12 is, in perspective view, the rodenticide conduit, downspout elbow, and downspout.

As best seen in FIG. 6, cutter blade 32, shafts 30 and 30a, collar 34, and spout 44 make up a unitary detachable cutter attachment. Shaft 30 is supported in an upper collar 50 mounted over the down-turned end of pipe 26a so that shaft 30 passes from drive head 28 down through collar 50 and the down-turned end of pipe 26a into lower collar 34. Gas flowing in direction B under pressure, typically 90-120 psi, through pipe 26a turns vertically downwardly through the down-turned end of pipe 26a. With the cutter attachment mounted under bonnet 24, gas from pipe 26a passes into collar 34 and out from spout 44 into bonnet cavity 24a. With pipe extension attachment 46 mounted under bonnet 24 instead of the cutter attachment, gas from pipe 26a flows down through down pipe 48. The upper opening into upper collar 50 is capped by a cap 50a when the pipe extension attachment is used. The vertical pipe extension attachment 46 may be seen in FIG. 7. Attachment 46 also has a flange 34a for mounting up against the upper surface of bonnet 24. Rigid down pipe 48 extends downwardly from flange 34a so as to dispose its lowermost opening 48a in or adjacent a horizontal plane containing rim 24b of bonnet 24. Thus opening 48a may be placed directly over a gopher hole 22. Gas thus flows in direction C out from opening 48a.

Valves are provided, as better described below, to control the flow of exhaust into and out of the compressor. For example, fresh air may be selected instead of the exhaust gas from motor 42 to fill the compressor reservoir. The pressurized gas from the compressor may be redirected to uses other than only through the first pipe 26a.

Second pipe 26b is mounted alongside first pipe 26a in arm 16. A first end of second pipe 26b, the end adjacent the frame, is in fluid communication with both the motor exhaust and a reservoir 52 containing fluid ammonia. The fluid ammonia is pumped by pump 54 into the exhaust conduit 40 feeding the second pipe 26b. The exhaust vaporizes the ammonia fluid to air ammonia gas. The mixture of motor exhaust and ammonia gas flows through second pipe 26b into the bonnet cavity 24a through both the distal end of the second pipe 26b mounted to an aperture in upper surface 24c of bonnet 24 and muffler 54. The exhaust/ammonia gas mixture flows in direction D to diffuse into and mix with the gas from pipe 48 occupying cavity 24a. Some of the gas from muffler 54 entrains into the down flow through pipe 48 via apertures 56 in radially spaced apart array around pipe 48. Thus ammonia gas may also be injected into the gopher burrows through gopher holes 22 along with the pressurized injection of gas from first pipe 26a.

Figure 2:
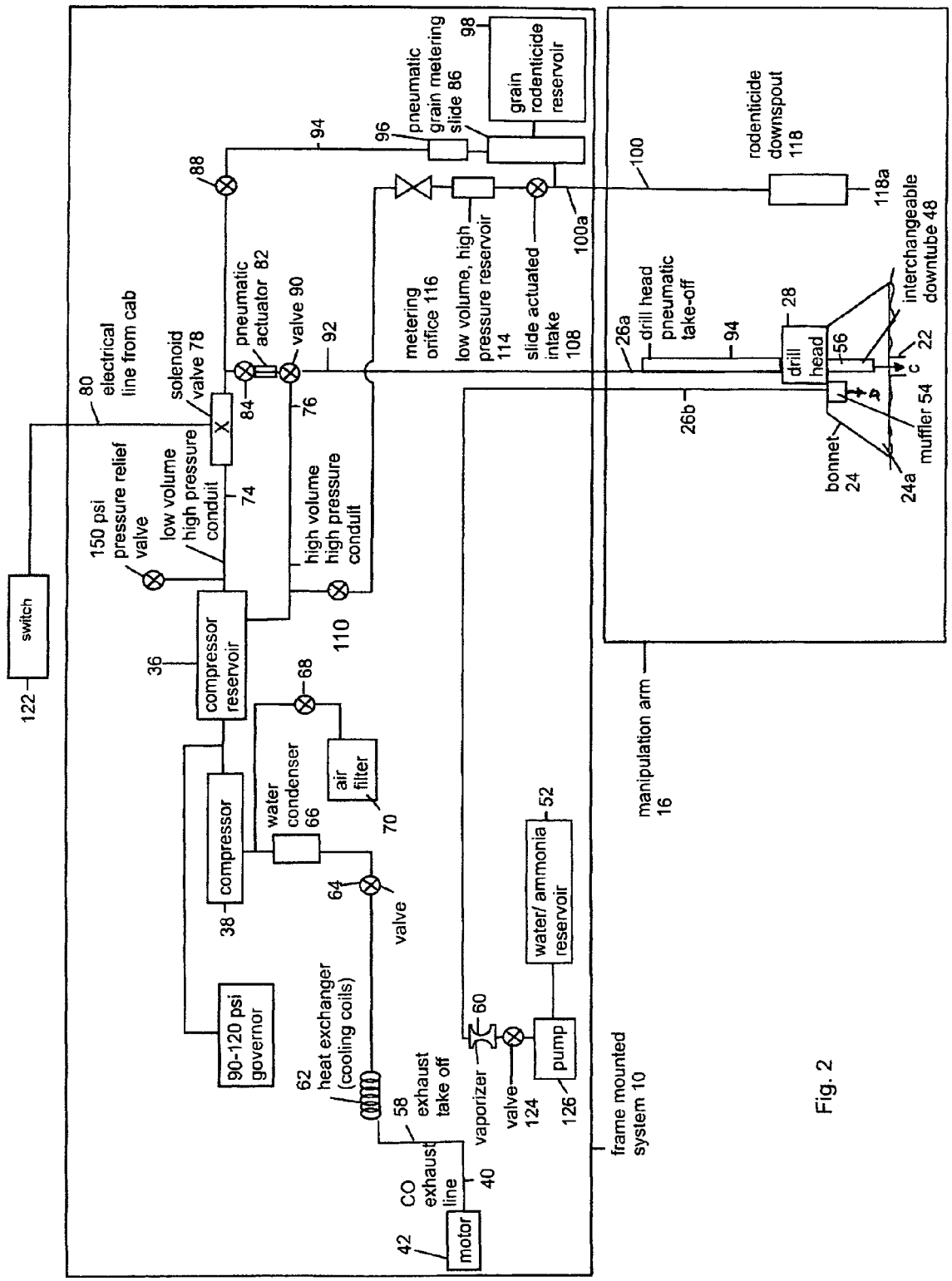
FIG. 2 is a schematic view of the gas flow paths both in the frame mounted system and in the manipulator arm in the exterminating apparatus of FIG. 1.
Figure 4A:
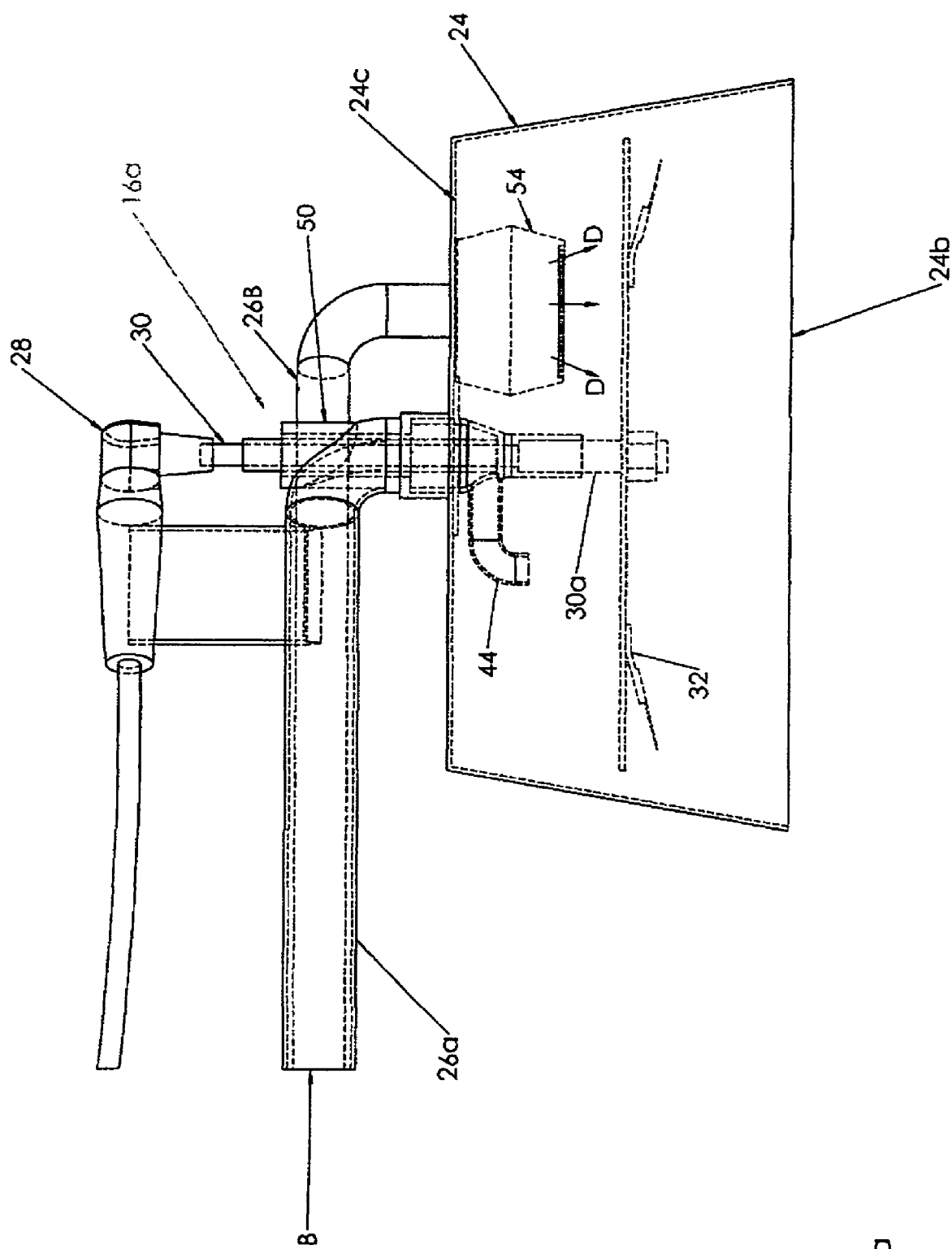
FIG. 4a is; in partially cut away enlarge view, an enlarged portion of FIG. 4.

As schematically illustrated in FIG. 2, within frame mounted system 10, frame mounted motor 42, which is an internal combustion engine, generates exhaust exhausting through exhaust outlet pipe 40. Exhaust outlet pipe 40 is the primary exhaust pipe for motor 42 and extends directly to arm 16 where it flows into second pipe 26b, being pipe of substantially the same cross sectional size. The exhaust flowing from second pipe 26b exhausts under bonnet 24 through muffler 54 in bonnet cavity 24a.

Exhaust take off line 58, which in the illustrated embodiment is located upstream relative to ammonia feed line 60 along exhaust line 40, diverts high temperature exhaust from motor 42 through a heat exchanger such as the illustrated heating coils 62 and then into compressor 38 through valve 64 and moisture condenser 66. Compressor 38 compresses the exhaust from exhaust take off line 58 into compressor reservoir 36. Compressor 38 is governed to a 90-120 psi pressure range by an associated governor. When it is desired to use compressed ambient air rather than compressed exhaust, for example when delivering rodenticide, valve 64 is closed and valve 68 opened so as to allow the intake of ambient air through air filter 70.

A pressure safety valve is provided on the outlet side of compressor reservoir 36 150 psi pressure relief valve 72. Outlet air from compressor reservoir 36 is provided through both a low volume, high pressure conduit 74 and a high volume, high pressure conduit 76, it being understood that, as stated above, in this context high pressure is meant as the approximately 120 psi output from compressor reservoir 36. Conduit 74 provides low volume, high pressure gas from compressor reservoir 36 to electrically actuated solenoid valve 78. Solenoid valve 78 is actuated from within cab 14 by an operator for example toggling an electrical switch (SW) 122 so as to energize electrical line 80 thereby actuating solenoid valve 78. With solenoid valve 78 actuated into its open position by the signal from the operator, low volume high pressure gas from compressor reservoir 36 is provided for actuation of either pneumatic actuator 82 as governed by valve 84, or pneumatic grain metering slide 86 as governed by valve 88.

Pneumatic actuator 82 actuates mechanical valve 90 so as to allow high volume high pressure gas from compressor reservoir 36 through conduit 76 and into the high volume, high pressure pipe 92 leading to first pipe 26a on arm 16. Rotary drive head pneumatic take off line 94 takes high pressure gas from first pipe 26a to drive rotary drive head 28. Thus upon the operator toggling switch 122 to energize electrical line 80, and with valve 84 in the open position and valve 88 in the closed position, valve 90 is thereby opened providing high volume high pressure gas into gopher hole 22 through down pipe 48 in bonnet 24. In the instance wherein down pipe 48 has been interchanged for the cutter attachment driving cutter blade 32, the high volume, high pressure gas in first pipe 26a also drives the rotary drive head 28 via pneumatic take off line 94.

With valve 84 closed, and valve 88 open, the low volume, high pressure gas from compressor reservoir 36 flows through low volume, high pressure pipe 94 so as to actuate pneumatic grain metering slide 86 by actuation of pneumatic cylinder 96. Metering slide 86 is mounted underneath a reservoir 98 of particulate, for example, grain rodenticide 86a which flows under the force of gravity downward from the reservoir and into a metered tube or orifice within the slide. When slide 86 is actuated in direction E by operation of pneumatic cylinder 96, the metered amount of rodenticide 86a held within the metered tube or orifice in the slide is slid over a lower opening in the slide housing so as to deposit the rodenticide downwardly in direction E', again under the force of gravity, into the delivery chamber of the tube at the upstream end 100a of rodenticide delivery conduit 100.

As grain metering slide 86 is driven in direction E by the operation of pneumatic cylinder 96, against the return biasing force of spring 102, a rigid shoe 104 mounted so as to rigidly depend from under slide 86, also slides in direction E so as to engage and downwardly depress a valve actuating lever 106. Depressing and then releasing valve actuating lever 106 as shoe 104 translates onto and back from engagement with lever 106 opens valve 108. With upstream valve 110 open on low volume, high pressure line 112 so as to pressurize low volume, high pressure reservoir 114 through metering orifice 116, opening of slide actuated valve 108 discharges the compressed gas from reservoir 114 through rodenticide delivery conduit 100 thereby carrying with it the metered amount of rodenticide previously deposited from grain metering slide 86 into the delivery chamber of the tube immediately upstream of upstream end 100a. The metered amount of rodenticide once initially given the impulse into the upstream end 100a by the compressed air escaping as a burst from the relatively small reservoir 114, is urged by the continuing flow of air from line 112 as metered through metering orifice 116. The continuing flow of air urges the rodenticide downstream along conduit 100 so as to be delivered from the downstream-most opening 118a of downspout 118.

Thus in operation, with downspout 118 pivoted on its hinged mounting 120 on pipe 26b, so as to downwardly dispose downstream-most end 118a, and with valves 88, 108, and 110 open, and with valves 84 and 90 closed, an operator toggling switch 122 opens solenoid valve 78 thereby actuating slide 86 so as to deposit a metered amount of rodenticide from reservoir 98 into upstream-end 100a. The movement of shoe 104 under the return biasing force of spring 102 actuates valve actuating lever 106 to thereby vent reservoir 114 to urge the rodenticide deposited from slide 86 down along conduit 100. With rodenticide downspout 118 positioned over a gopher hole 22, rodenticide leaving opening 118a is deposited into gopher hole 22.

When it is desired to employ ammonia gas, whether or not in conjunction with the high pressure gas from compressor reservoir 36, valve 124 is opened and pump 126 actuated to pump liquid ammonia from reservoir 52 through valve 124. In one embodiment the liquid ammonia is forced through an atomizer (for example a small apertured constriction) through a vaporizer 128 so as to inject a flow of liquid ammonia into exhaust line 40. The liquid ammonia may be injected from the underside of exhaust line 40, and downstream of exhaust take off 58. In alternative embodiments in applicant's experience a vaporizer may not be required. The hot exhaust in exhaust line 40 vaporizes the liquid ammonia and carries the gaseous ammonia with the exhaust downstream along exhaust line 40 and into second pipe 26b for evacuation through muffler 54 in direction D under bonnet 24.

In a preferred embodiment, the downspout 118 is mounted to conduit 100 by an elbow 100b, the upper surface of which is formed of a perforated mesh. Applicant has found that the use of the mesh on the upper-most surface of elbow 100b provides an indication to the operator that the metered rodenticide has in fact been delivered as the mesh provides a view port. In applicant's experience, the particulate rodenticide as it is turned by elbow 100b, backflows up against the underside of the mesh providing a visual indicator to the operator that in fact the metered amount of rodenticide has been delivered to downspout 118.

When gopher hole 22 has been mounded-up, for example if a badger has gone into the hole, the operator may retract cylinders 130 so as to rotate frame 12 in direction F downwardly so as to lower blade 132. The tractor may then be driven forward so as to use the blade to scrape the mound flat.

When in use with the bonnet covering over the gopher hole opening, the operator may selectively choose to either employ exhaust gas from motor 42, or to mix gaseous ammonia with the exhaust gas. If installed, simultaneously cutter blade 32 rotates on the drive shaft from the rotary drive head 28 to exterminate a gopher which attempts to escape from being gassed by exiting back up through the target gopher hole covered by bonnet 24, in which case the rotating blade engages the gopher thereby killing it.

In use, applicant has found that the bonnet need only be held over a gopher hole for a short period of time to be effective before moving on to another gopher hole.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for exterminating subterranean burrowing air-breathing animals which burrow subterranean tunnels having burrow hole openings at ground level, the system comprising:

an elongate arm having a base end and an opposite distal end, a frame mountable to a vehicle, said base end of said arm mounted to said frame, a selectively actuable actuator mounted so as to cooperate between said frame and said arm, said actuator when selectively actuated operating to at least raise and permit lowering of said distal end of said arm so that said distal end of said arm is positioned directly over a burrow hole opening wherein said actuator is remotely actuable from within said vehicle when said frame is mounted to said vehicle, at least one reservoir of at least one lethal substance lethal to the air-breathing animals when introduced into the burrow hole openings, said at least one reservoir mounted adjacent said frame, at least one conduit cooperating between said at least one reservoir and said arm, means for urging said at least one lethal substance alone said at least one conduit to convey said at least one lethal substance along said arm for delivery of said at least one lethal substance from said distal end of said arm into the burrow hole openings, wherein said means for urging said at least one lethal substance along said arm is remotely actuable from within said vehicle when said frame is mounted to said vehicle, and wherein said distal end of said arm is adapted to cover at least one of the burrow hole openings but is not adapted to penetrate said distal end into the burrow hole openings in order to deliver said at least one lethal substance into a lethal proximity to the animals to be exterminated, wherein said distal end covers the burrow hole openings by means of a bonnet mounted to, so as to form part of, said distal end of said arm, said bonnet defining a bonnet cavity and having a lower opening into said cavity, said bonnet downwardly disposing said opening below said arm, said bonnet cooperating with said at least one conduit so that delivery of one lethal substance of said at least one lethal substance is into said bonnet cavity for delivery therefrom into the burrow hole openings while the bonnet covers the openings, and wherein said arm includes hollow first and second conduits extending from substantially said frame to said distal end of said arm, each said first and second conduits having a base end and an opposite distal end, said distal ends of said first and second conduits mounted in fluid communication with said bonnet cavity, said base ends of said first and second conduits mounted in fluid communication with, respectively, a source of exhaust gas from an internal combustion engine, and a second source of lethal gas wherein said lethal gas is lethal either directly as a poison or indirectly as a suffocating agent to the air-breathing burrowing animals.

2. The system of claim 1 further comprising a blade mounted within said bonnet cavity so as to be disposed over and adjacent one of the burrow hole openings when said bonnet is mounted in said sealing engagement there over, said blade selectively actuable by a blade actuator so as to kill the burrowing animal should the burrowing animal exit through the burrow hole opening and into said bonnet cavity.

3. The system of claim 1 wherein said at least one reservoir includes a rodenticide reservoir for storing rodenticides, said rodenticide reservoir mounted in fluid communication, via a third conduit mounted on said arm, with a downspout depending from said arm, said downspout sized to release a metered quantity of rodenticide from said rodenticide reservoir into the burrow hole opening.

4. The system of claim 3 wherein said rodenticide reservoir is mounted on said arm, and further comprising a selectively actuable rodenticide flow controller for selectively controlling flow of rodenticide to said downspout.

5. The system of claim 1 wherein at least one of said first and second conduits is rigid, and wherein said arm consists only of said first and second conduits.

6. The system of claim 2 wherein said blade actuator is a selectively actuable blade drive mounted to an upper side of said distal end of said arm and cooperating in driving engagement with said blade within said bonnet cavity.

7. A method for exterminating subterranean burrowing air-breathing animals which burrow subterranean tunnels having burrow hole openings at ground level, the method comprising the steps of:

a) providing:

(i) an elongate arm having a base end and an opposite distal end, (ii) a frame mounted to a vehicle, said base end of said arm mounted to said frame, (iii) a selectively actuable arm actuator mounted so as to cooperate between said frame and said arm, said actuator when selectively actuated operating to at least raise and permit lowering of said distal end of said arm so that said distal end of said arm is positioned directly over a burrow hole opening wherein said actuator is remotely actuable from within said vehicle when said frame is mounted to said vehicle, (iv) at least one reservoir of at least one lethal substance lethal to the air-breathing animals when introduced into the burrow hold openings, said at least one reservoir mounted adjacent said frame, (v) at least one conduit cooperating between said at least one reservoir and said arm, and means for urging said at least one lethal substance along said at least one conduit to convey said at least one lethal substance along said arm for delivery of said at least one lethal substance from said distal end of said arm into the burrow hole openings, wherein said means for urging said at least one lethal substance along said arm is remotely actuable from within said vehicle when said frame is mounted to said vehicle, and wherein said distal end of said arm is adapted to cover at least one of the burrow hole openings but is not adapted to penetrate said distal end into the burrow hole openings in order to deliver said at least one lethal substance into a lethal proximity to the animals to be exterminated, (vi) a bonnet mounted to said distal end of said arm, said bonnet defining a bonnet cavity and having a lower opening into said cavity, said bonnet mounted to said distal end of said arm so as to downwardly dispose said opening below said arm, said bonnet cooperating with said at least one conduit so that delivery of one lethal substance of said at least one lethal substance is into said bonnet cavity for delivery therefrom into the burrow hole openings, and wherein said step of positioning said vehicle further comprises positioning said vehicle to position said bonnet into proximity with the burrow hole opening, and wherein said step of remotely actuating said arm actuator further comprises remotely actuating said arm actuator to place said bonnet cavity into sealing engagement over said burrow hole opening;

(vii) an internal combustion engine mounted on said frame, providing a second source of lethal gas, and providing on said arm hollow first and second conduits extending from substantially said frame to said distal end of said arm, each said first and second conduits having a base end and an opposite distal end, said distal ends of said first and second conduits mounted in fluid communication with said bonnet cavity, said base ends of said first and second conduits mounted in fluid communication with, respectively, a source of exhaust gas from said internal combustion engine, and said second source of lethal gas, wherein said lethal gas is lethal either directly as a poison or indirectly as a suffocating agent to the air-breathing burrowing animals, selectively actuating said means for urging so as to deliver one or both of said exhaust gas and/or said lethal gas from said second sources;

b) positioning the vehicle so as to position said arm into proximity with one burrow hole opening of the burrow hole opening and covering the opening with said distal end of said arm;

c) remotely actuating said arm actuator from inside the vehicle to actuate said arm so as to place said distal end of said arm over said burrow hole opening;

d) remotely actuating from inside the vehicle said means for urging so as to convey said at least one lethal substance along said arm and deliver said at least one lethal substance into the burrow hole opening without penetrating said distal end into the opening.

8. The method of claim 7 further comprising the step of providing a blade and blade actuator, said blade detachably mounted within said bonnet cavity so as to dispose said blade over and adjacent the burrow hole opening when said bonnet is in said sealing engagement thereover, and selectively actuating said blade actuator to actuate said blade so as to kill the burrowing animal should the burrowing animal exit through the burrow hole opening and into said bonnet cavity.

9. The method of claim 7 wherein said steps of providing said at least one reservoir includes providing a rodenticide reservoir and rodenticide flow controller mounted in fluid communication with a third conduit mounted on said arm and with a downspout depending from said arm at the opposite end of said third conduit, said downspout sized to release a metered quantity of rodenticide from said rodenticide reservoir and said flow controller into the burrow hole opening, and actuating said flow controller to meter the metered quantity of rodenticide into the burrow hole opening.

10. A system for exterminating subterranean burrowing air-breathing animals which burrow subterranean tunnels having burrow hole openings at ground level, the system comprising:

an elongate arm having a base end and an opposite distal end, a frame mountable to a vehicle, said base end of said arm mounted to said frame, a selectively actuable actuator mounted so as to cooperate between said frame and said arm, said actuator when selectively actuated operating to at least raise and permit lowering of said distal end of said arm so that said distal end of said arm is positioned directly over a burrow hole opening wherein said actuator is remotely actuable from within said vehicle when said frame is mounted to said vehicle, at least one reservoir of at least one lethal substance lethal to the air-breathing animals when introduced into the burrow hole openings, said at least one reservoir mounted adjacent said frame, at least one conduit cooperating between said at least one reservoir and said arm, means for urging said at least one lethal substance along said at least one conduit to convey said at least one lethal substance along said arm for delivery of said at least one lethal substance from said distal end of said arm into the burrow hole openings, wherein said means for urging said at least one lethal substance along said arm is remotely actuable from within said vehicle when said frame is mounted to said vehicle, a bonnet mounted to said distal end of said arm, said bonnet defining a bonnet cavity and having a lower opening into said cavity, said bonnet mounted to said distal end of said arm so as to downwardly dispose said opening below said arm, said bonnet cooperating with said at least one conduit so that delivery of one lethal substance of said at least one lethal substance is into said bonnet cavity for delivery therefrom into the burrow hole openings, wherein said arm includes hollow first and second conduits extending from substantially said frame to said distal end of said arm, each said first and second conduits having a base end and an opposite distal end, said distal ends of said first and second conduits mounted in fluid communication with said bonnet cavity, said base ends of said first and second conduits mounted in fluid communication with, respectively, a source of exhaust gas from an internal combustion engine, and a second source of lethal gas wherein said lethal gas is lethal either directly as a poison or indirectly as a suffocating agent to the air-breathing burrowing animals.

11. The system of claim 10 further comprising a blade mounted within said bonnet cavity so as to be disposed over and adjacent one of the burrow hole openings when said bonnet is mounted in said sealing engagement there over, said blade selectively actuable by a blade actuator so as to kill the burrowing animal should the burrowing animal exit through the burrow hole opening and into said bonnet cavity.

12. The system of claim 10 wherein said at least one reservoir includes a rodenticide reservoir for storing rodenticides, said rodenticide reservoir mounted in fluid communication, via a third conduit mounted on said arm, with a downspout depending from said arm, said downspout sized to release a metered quantity of rodenticide from said rodenticide reservoir into the burrow hole opening.

13. The system of claim 12 wherein said rodenticide reservoir is mounted on said arm, and further comprising a selectively actuable rodenticide flow controller for selectively controlling flow of rodenticide to said downspout.

14. A method for exterminating subterranean burrowing air-breathing animals which burrow subterranean tunnels having burrow hole openings at ground level, the method comprising the steps of:

a) providing:

(i) an elongate arm having a base end and an opposite distal end, (ii) a frame mounted to a vehicle, said base end of said arm mounted to said frame, (iii) a selectively actuable arm actuator mounted so as to cooperate between said frame and said arm, said actuator when selectively actuated operating to at least raise and permit lowering of said distal end of said arm so that said distal end of said arm is positioned directly over a burrow hole opening wherein said actuator is remotely actuable from within said vehicle when said frame is mounted to said vehicle, (iv) at least one reservoir of at least one lethal substance lethal to the air-breathing animals when introduced into the burrow hold openings, said at least one reservoir mounted adjacent said frame, (v) at least one conduit cooperating between said at least one reservoir and said arm, and means for urging said at least one lethal substance along said at least one conduit to convey said at least one lethal substance along said arm for delivery of said at least one lethal substance from said distal end of said arm into the burrow hole openings, wherein said means for urging said at least one lethal substance along said arm is remotely actuable from within said vehicle when said frame is mounted to said vehicle;

b) positioning the vehicle so as to position said arm into proximity with one burrow hole opening of the burrow hole openings;

c) remotely actuating said arm actuator from inside the vehicle to actuate said arm so as to place said distal end of said arm over said burrow hole opening;

d) remotely actuating from inside the vehicle said means for urging so as to convey said at least one lethal substance along said arm and deliver said at least one lethal substance into the burrow hole opening.

and further comprising the step of providing a bonnet mounted to said distal end of said arm, said bonnet defining a bonnet cavity and having a lower opening into said cavity, said bonnet mounted to said distal end of said arm so as to downwardly dispose said opening below said arm, said bonnet cooperating with said at least one conduit so that delivery of one lethal substance of said at least one lethal substance is into said bonnet cavity for delivery therefrom into the burrow hole openings, and wherein said step of positioning said vehicle further comprises positioning said vehicle to position said bonnet into proximity with the burrow hole opening, and wherein said step of remotely actuating said arm actuator further comprises remotely actuating said arm actuator to place said bonnet cavity into sealing engagement over said burrow hole opening, and further comprising the steps of providing an internal combustion engine mounted on said frame, providing a second source of lethal gas, and providing on said arm hollow first and second conduits extending from substantially said frame to said distal end of said arm, each said first and second conduits having a base end and an opposite distal end, said distal ends of said first and second conduits mounted in fluid communication with said bonnet cavity, said base ends of said first and second conduits mounted in fluid communication with, respectively, a source of exhaust gas from said internal combustion engine, and said second source of lethal gas, wherein said lethal gas is lethal either directly as a poison or indirectly as a suffocating agent to the air-breathing burrowing animals, selectively actuating said means for urging so as to deliver one or both of said exhaust gas and/or said lethal gas from said second source.

15. The method of claim 14 further comprising the step of providing a blade and blade actuator, said blade detachably mounted within said bonnet cavity so as to dispose said blade over and adjacent the burrow hole opening when said bonnet is in said sealing engagement thereover, and selectively actuating said blade actuator to actuate said blade so as to kill the burrowing animal should the burrowing animal exit through the burrow hole opening and into said bonnet cavity.

16. The method of claim 15 wherein said steps of providing said at least one reservoir includes providing a rodenticide reservoir and rodenticide flow controller mounted in fluid communication with a third conduit mounted on said arm and with a downspout depending from said arm at the opposite end of said third conduit, said downspout sized to release a metered quantity of rodenticide from said rodenticide reservoir and said flow controller into the burrow hole opening, and actuating said flow controller to meter the metered quantity of rodenticide into the burrow hole opening.

* * * * *